Sept. 20, 1971      R. E. BROWN      3,605,642
FORTUNE COOKIE MACHINE
Filed Nov. 27, 1968      6 Sheets-Sheet 1
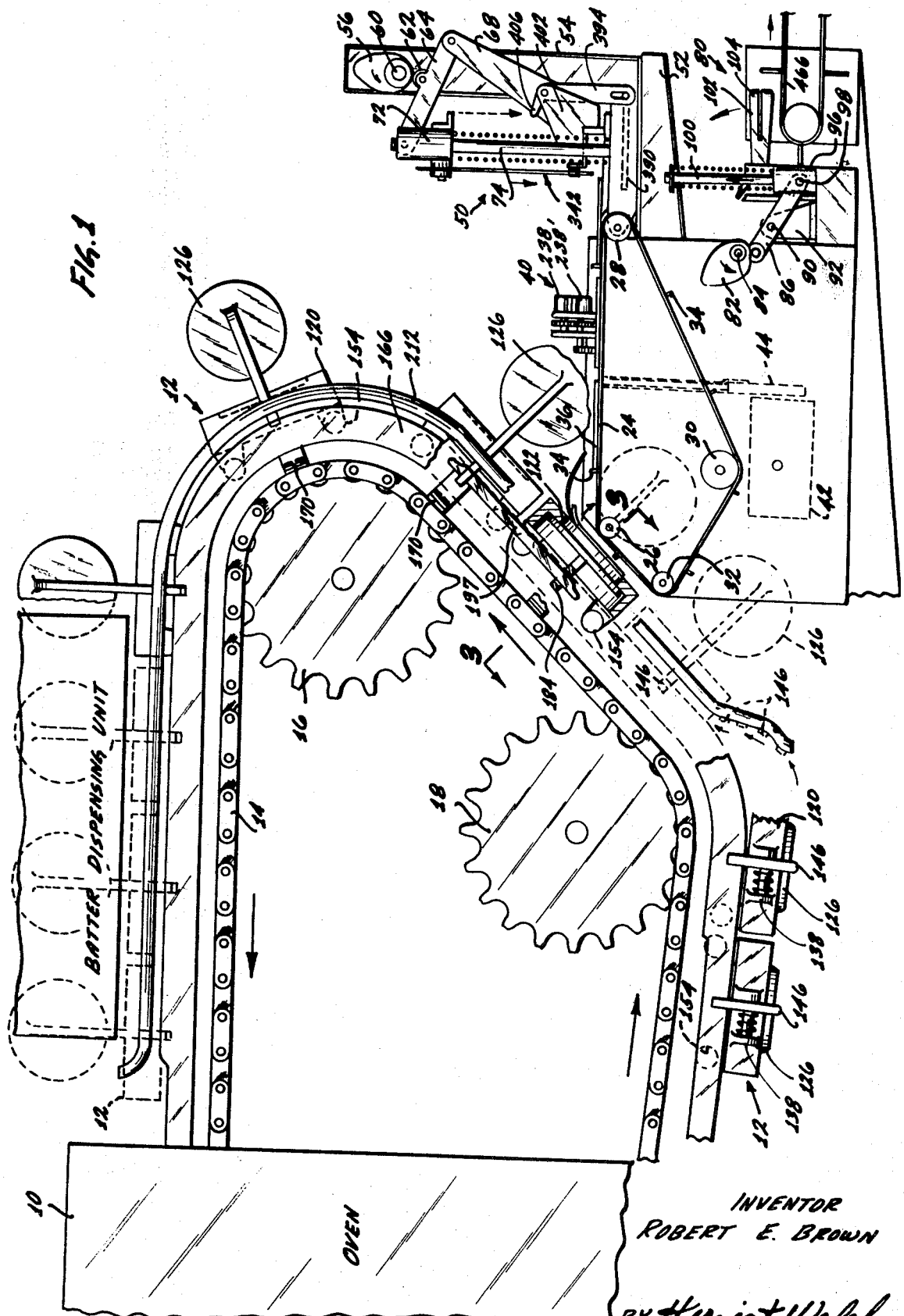
INVENTOR
ROBERT E. BROWN
BY Herzig + Walsh
ATTORNEYS

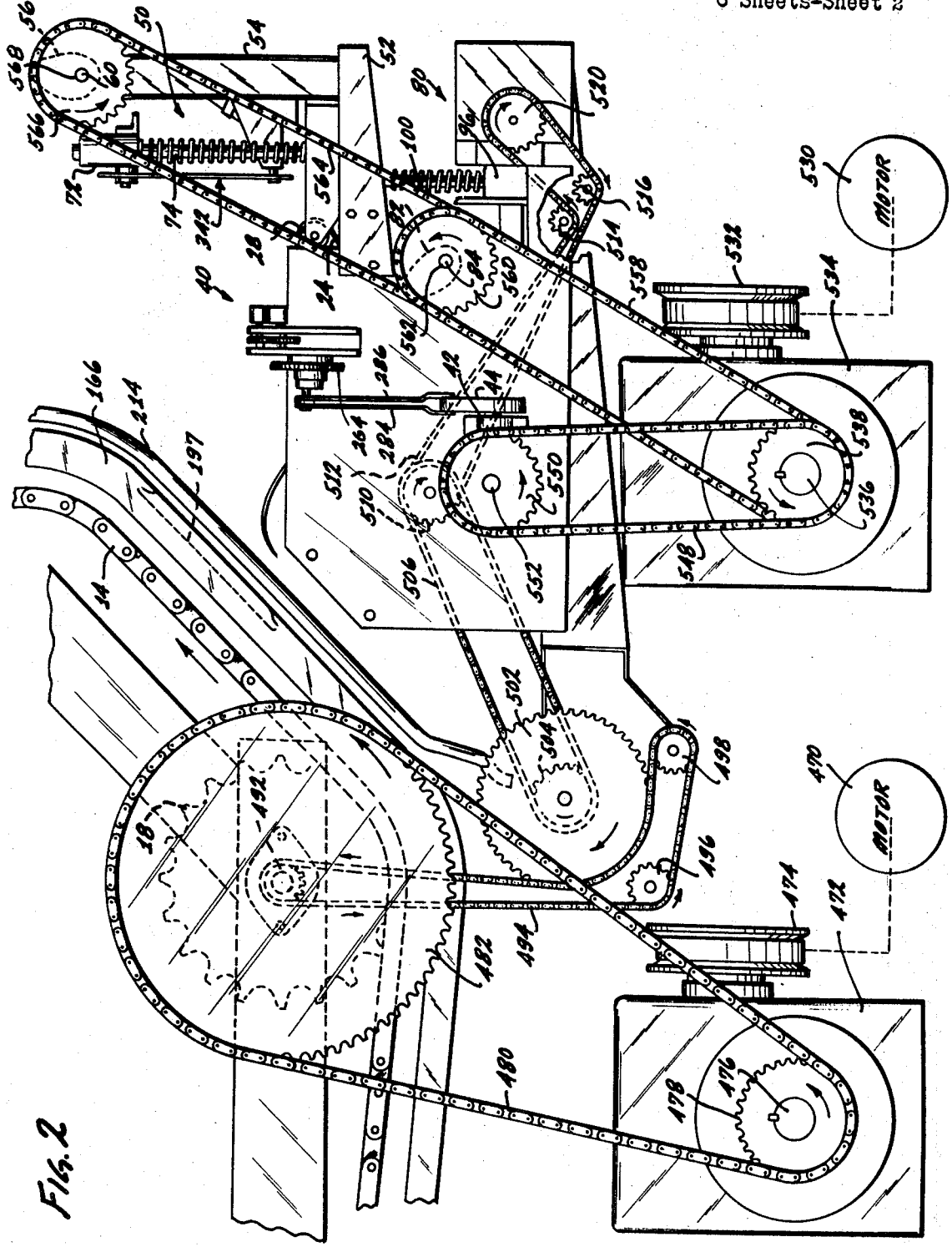

Sept. 20, 1971    R. E. BROWN    3,605,642
FORTUNE COOKIE MACHINE
Filed Nov. 27, 1968    6 Sheets-Sheet 5
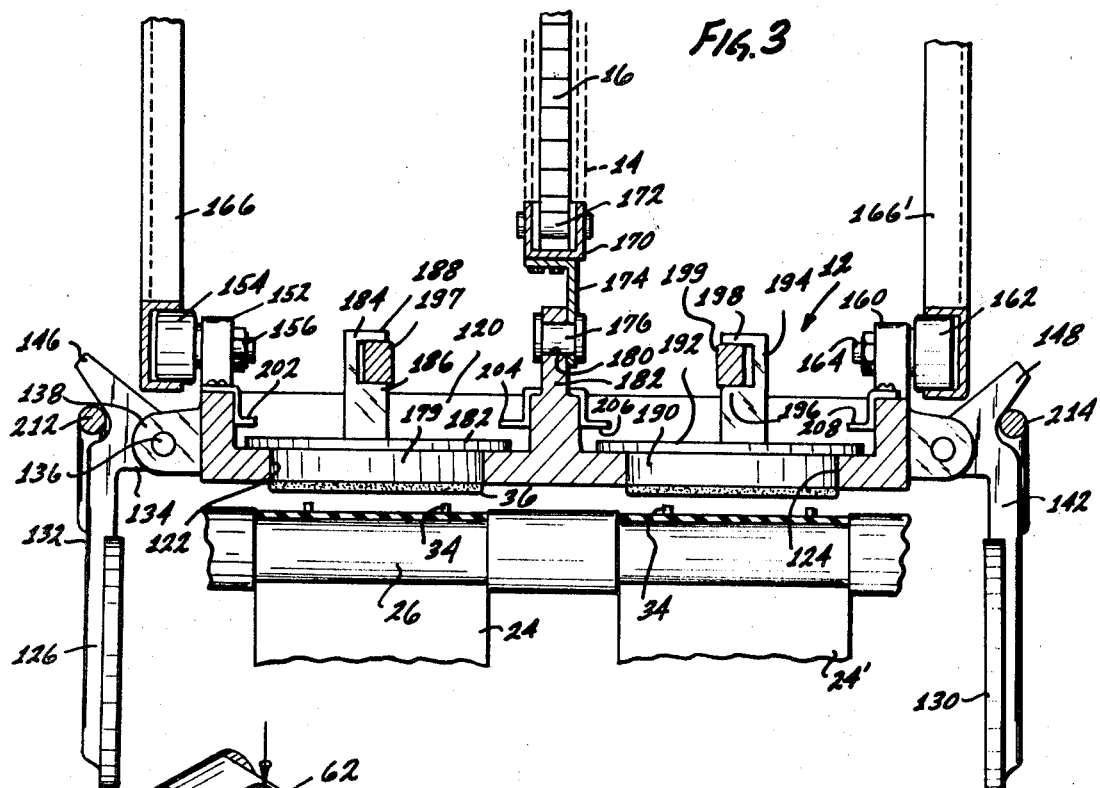
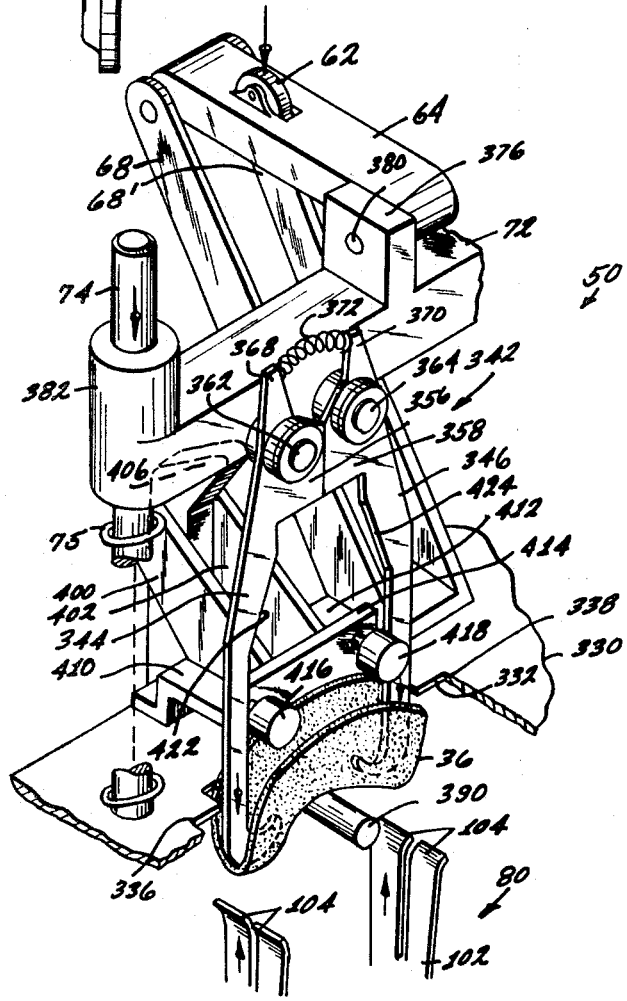
INVENTOR
ROBERT E. BROWN
BY Herzig & Walsh
ATTORNEYS

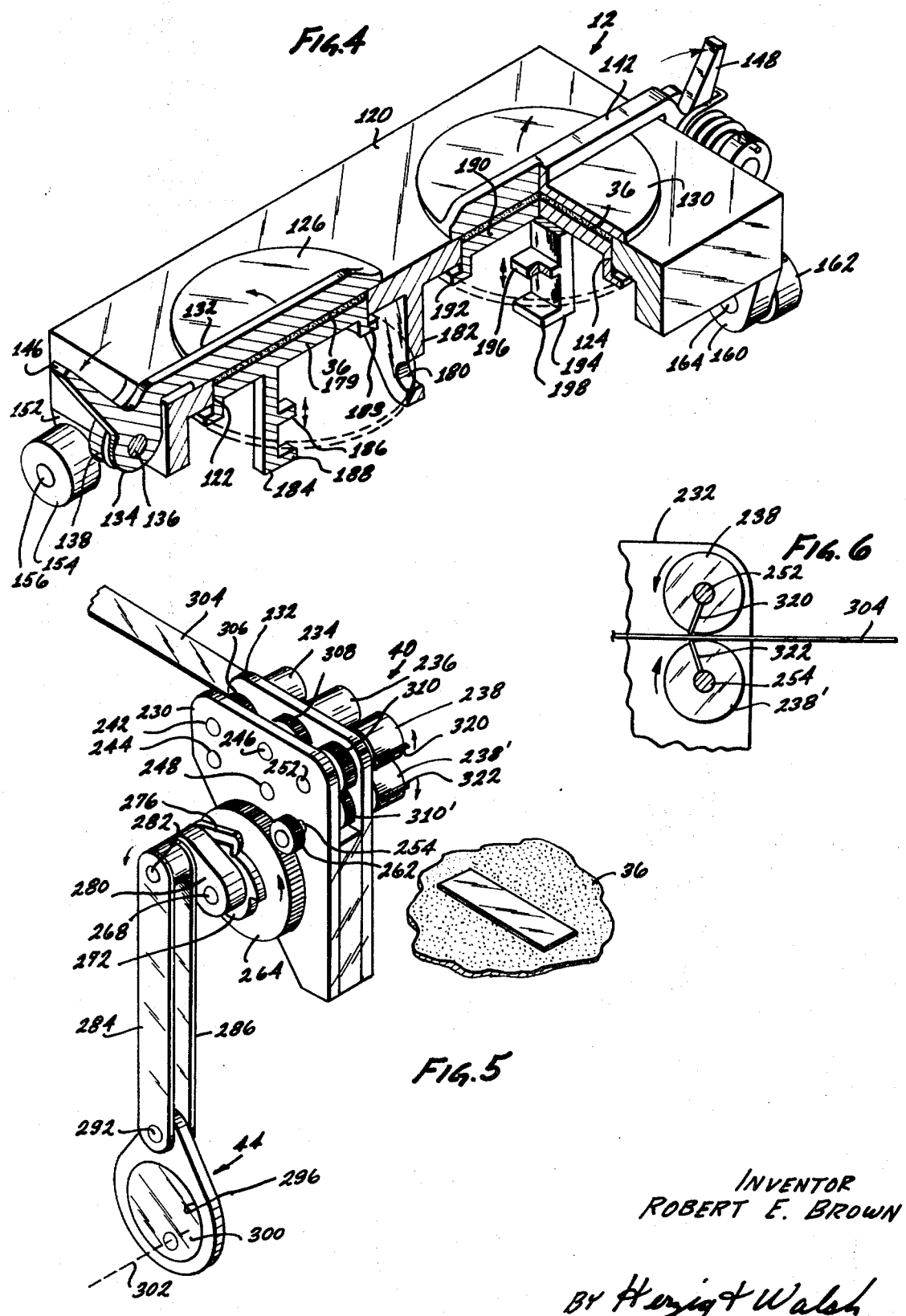

Sept. 20, 1971  R. E. BROWN  3,605,642
FORTUNE COOKIE MACHINE

Filed Nov. 27, 1968  6 Sheets-Sheet 5

INVENTOR
ROBERT E. BROWN by Herzig & Walsh
ATTORNEYS

Sept. 20, 1971  R. E. BROWN  3,605,642
FORTUNE COOKIE MACHINE
Filed Nov. 27, 1968  6 Sheets-Sheet 6
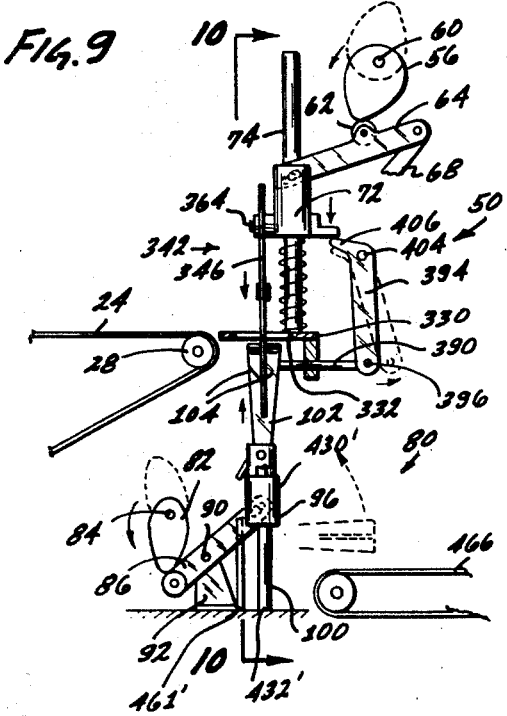
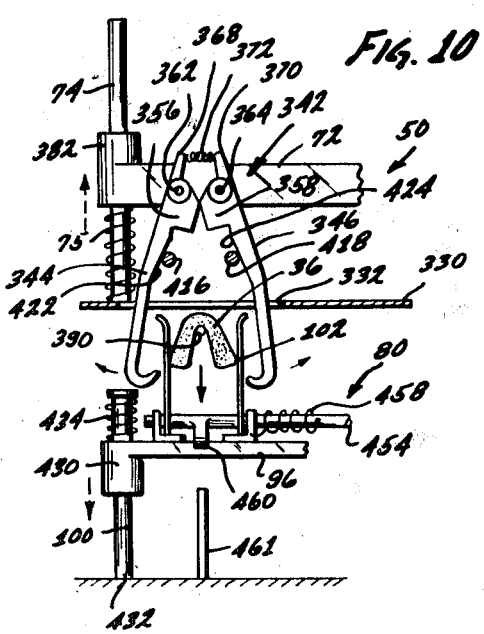
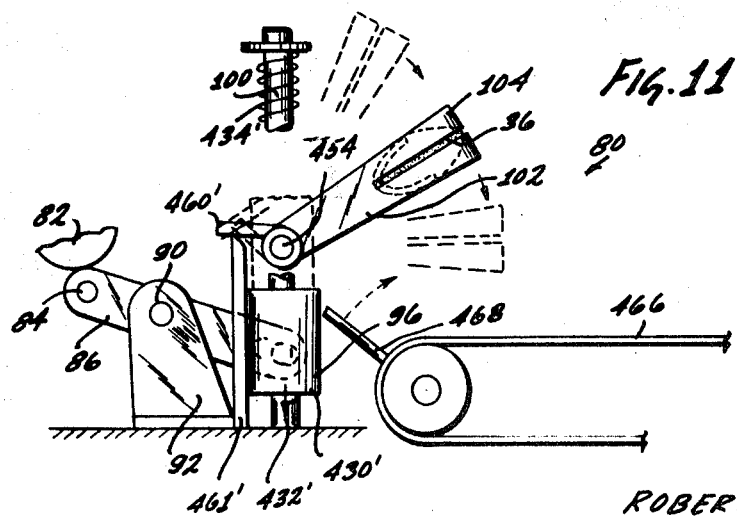
INVENTOR
ROBERT E. BROWN
BY Herzig & Walsh
ATTORNEYS

United States Patent Office 3,605,642
Patented Sept. 20, 1971

3,605,642
FORTUNE COOKIE MACHINE
Robert E. Brown, Pasadena, Calif., assignor to Sam Ward Company, Inc., Los Angeles, Calif.
Filed Nov. 27, 1968, Ser. No. 779,384
Int. Cl. A21b *5/00;* A21c *9/00*
U.S. Cl. 107—4A
10 Claims

ABSTRACT OF THE DISCLOSURE

The invention is a fortune cookie making machine. The batter is cooked in cooking units that are carried through an oven on a conveyor. The cooked batter units are ejected from the cooking unit and conveyed to a unit which places a fortune cookie slip on them and then to a folding unit which folds the fortune cookie about the fortune cookie slip. The folded fortune cookie is removed from the folding unit by a take-away unit which places it on a final conveyor.

SUMMARY OF THE INVENTION

The invention is a fortune cookie making machine which automatically performs the complete operation of forming the fortune cookies and discharging them in finished form. The machine includes components or parts which perform the delivery to the machine of the batter and cooking of the batter; the association of the fortune cookie slip with the cookies; and the appropriate folding of the cookies around the fortune slip and delivery thereof from the machine.

The market for fortune cookies is substantial inasmuch as they are very tasty as a food confection but particularly from the standpoint of the fortune slip that is folded into them. More conventionally in the past fortune cookies have been made using equipment which was substantially less than being fully automated and mechanized. Accordingly, there was a requirement for a substantial amount of human effort in connection with the producing of the fortune cookies, in the way of feeding material to the machine and removing the cookies therefrom, etc. The machine as described herein is a completely automatic or automated machine for making fortune cookies wherein the batter is automatically delivered to the machine and is cooked; the fortune slip is delivered to the cooky material; the cookies are folded around the fortune slip and automatically delivered from the machine. The primary object of the invention is accordingly to make available a fortune cookie machine which is fully automatic and automated and capable of automatically carrying out of aforesaid operations and delivering fortune cookies therefrom. Further objects reside in the achievement in such a machine of complete effectiveness; simplicity of construction and maintenance; durability and ease of operation.

The machine of the invention incorporates particular improvements in various components of the machine. A feature of the machine is that the batter for the fortune cookies is delivered from a hopper into a cooking unit which is carried by a conveyor to an oven for cooking of the batter. Novel means are provided for discharging the fortune cookies from the cooking unit as it emerges from the oven and delivering the cookies or cookie units to a dispensing unit for the fortune slips which are delivered onto the cookies. The cooking unit embodies cylindrical cavities in which the batter is cooked with means for discharging or ejecting the cooked batter from the cavities for delivery onto a conveyor. A further object resides in the realization of the particular improved results stemming from this manner of handling the cookies while being cooked and discharged from the cooking unit.

After the fortune slips are automatically placed on the cookies they are delivered to the folding component which itself embodies certain improvements in this type of mechanism. This component embodies automatically operated members which fold the circular cookie about one diameter and substantially simultaneously fold it about a second diameter which is at right angles to the first diameter so that the fortune slip which is on the cookie at the time, is folded into the cookie. In addition particular novel means are provided to effectively remove and take away the folded cookie after being folded, this mechanism having the particular capability of being able to grasp the cookie although still in a plastic state and successfully remove it and deliver it to a take away conveyor without damaging or impairing the desired shape which has been imparted to the fortune cookie. Realization of this particular end as just described, is a further important object of the invention. A further object is to make available and realize effective automatic mechanism as described in detail herein capable of realizing this purpose and successfully removing the cookie while in a plastic state without imparing its configuration.

Further objects of the invention reside in particular constructional features and combinations of parts as set forth in the claims which are embodied in the cooking unit, the folding mechanism and the take-away mechanism.

Further objects and additional advantages of the invention will become apparent from the following description and annexed drawings wherein:

FIG. 1 is a partial view of the complete assembly of the machine showing the general relationship between the various components thereof;

FIG. 2 is a partly diagrammatic view illustrating the power sources and drives for the various components of the mahcines;

FIG. 3 is a sectional view taken along the line 3—3 of FIG. 1;

FIG. 4 is a cut-away perspective view of the cooking unit of the invention;

FIG. 5 is a perspective view showing the dispensing unit for fortune slips and a part of a cookie having a slip deposited thereon;

FIG. 6 is a detail view of a part of the fortune slip dispensing mechanism;

FIG. 8 is a partial perspective view similar to that of FIG. 7 showing one of the folding units in a different position;

FIGS. 9, 10 and 11 are partially schematic views of the folding mechanism and the take-away mechanism illustrating different positions thereof in order to portray the manner of operation.

General organization of the machine

Figure 7:
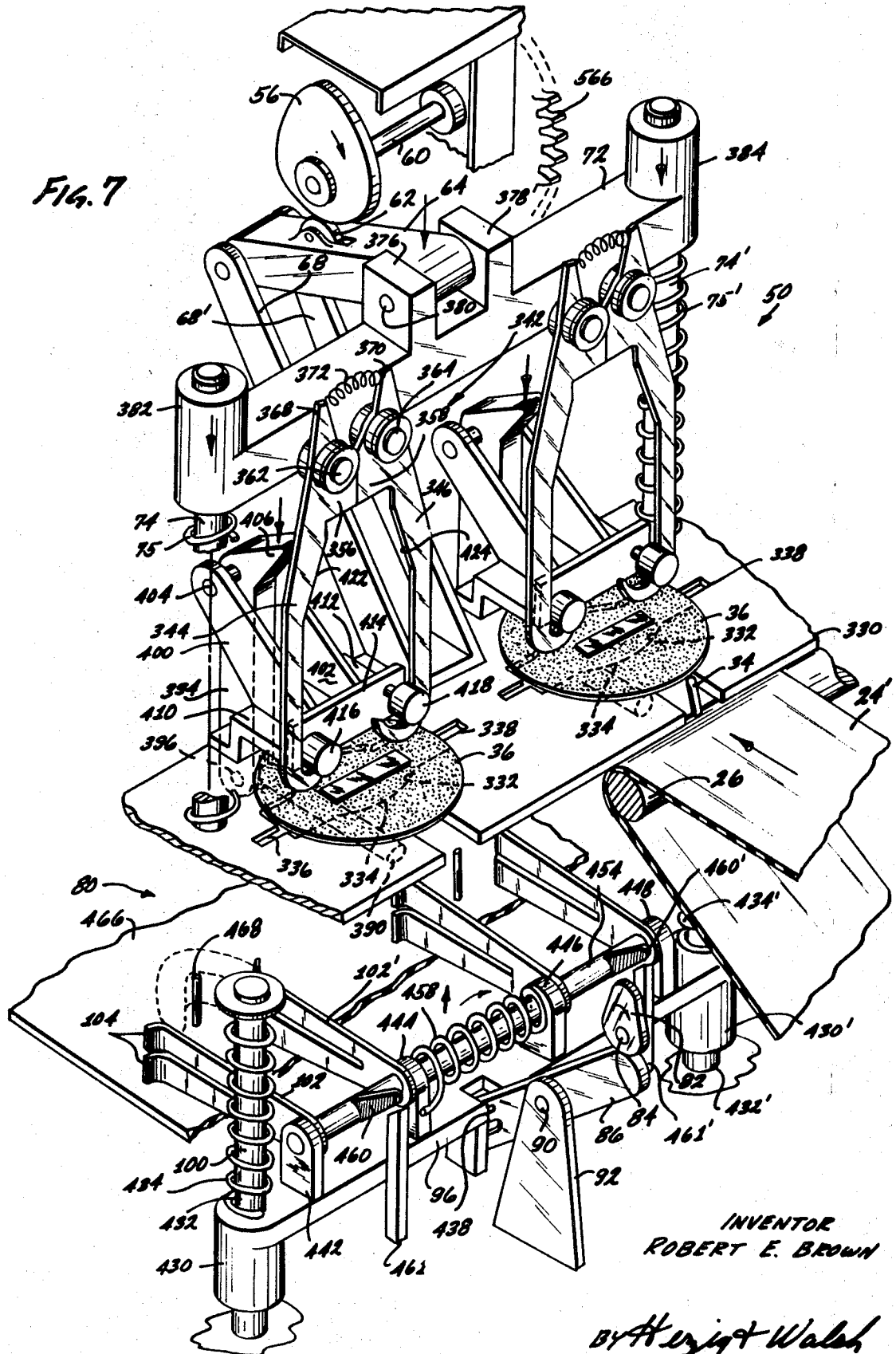
FIG. 7 is a perspective view of the folding and take-away mechanism of the machine.

FIG. 1 shows the general organization of the machine, the principal components of which will be described individually presently. The batter is cooked in an oven 10 in one or more cooking units which are carried through the oven on a conveyor. The oven itself may be generally conventional embodying heating means arranged to provide a sufficient temperature to cook the batter which still is in a plastic state when it comes out of the oven.

The batter is carried through the oven in one or more cooking units such as designated at 12 carried by a chain link conveyor 14 passing over sprocket wheels such as shown at 16 and 18.

The machine is driven by motors and the complete motor drive system will be described in detail presently.

The cookies coming out of the oven are discharged or ejected from the cooking unit by way of mechanism that will be described in detail presently, the ejected cookies being discharged onto a conveyor system comprising a conveyor belt as designated at 24 which operates over pulleys or rollers 26, 28, 30 and 32 as may be seen in FIG. 1. The cookies upon being ejected from the cooking unit 12 onto the conveyor belt 24 are carried by the projections 34 to the fortune slip dispensing unit which is designated at 40. The dispensing unit will be described in detail presently. It is driven from a gear box shown in outline at 42 and an eccentric cam mechanism 44 which will be described in detail presently.

The dispensing unit 40 dispenses a fortune slip onto the fortune cookie 36 which is then delivered to the folding component 50. The component 50 is supported from a part 52 of the frame of the machine. The frame has uprights one of which is shown at 54. The folding mechanism is operated primarily by a cam 56 on shaft 60, the cam engaging a follower 62 on a rocker arm 64 which is pivotally linked at its end to an arm formed by a pair of links 68 pivoted to a frame at their lower ends. The other end of the rocker arm or link 64 is pivotally attached to a cross head 72 which is vertically guided by guide stems such as shown at 74. The mechanism of the folding unit operates to fold the circular cookies first about one diameter and then about another diameter at right angles to the first diameter folding the fortune slip into the cookie. The details of the folding mechanism will be described presently. Also the manner of drive of the folding mechanism will be described as this description proceeds.

The take-away mechanism is designated generally at 80 in FIG. 1. It is operated primarily by a cam as designated at 82 on a shaft 84 the cam cooperating with a follower in the form of the end part of the pivoted rocker or link 86 pivoted on a shaft 90 supported on a support member 92. The opposite end of the link or arm 86 is pivotally attached to a cross head 96 by way of a pivot member 98. The cross head has end parts that are journalled on stems as shown at 100 to be guided vertically. The cross head 96 itself carries a transverse shaft on which is mounted the take-away yoke 102 which has a pair of resilient spring fingers as shown at 104. The take-away yoke rotates into a vertical position and then moves upwardly to grasp and take away the folded fortune cookie which is then transferred to the conveyor. The details of the take-away mechanism 80 will be described presently.

The drive mechanism for the various components shown in FIG. 2 will be described in detail after the detailed description of the various components.

The cooking unit

The cooking unit which has been referred to in connection with FIG. 1 is shown in greater detail in FIGS. 3 and 4. FIG. 4 shows the cooking unit 12 in an upright position which it is in during the course of its travel while it passes underneath the hopper, not shown, which dispenses the batter into the cooking unit. When the cooking unit comes out of the oven, being carried by the chain conveyor 14, it is upside down as may be seen in FIG. 1 and FIG. 3 shows it in the upside down position in which the fortune cookies are ejected from the cooking unit. Referring again to FIG. 4 the cooking unit comprises a metallic frame 120 shaped to constitute a receptacle in which articles can be cooked when subjected to appropriate heat. In the frame 120 are circular cavities 122 and 124 which receive the batter that is dispensed from the hopper and in which the batter is cooked. Numeral 126 designates a circular cover for the cavity 122 and numeral 130 designates a circular cover for the cavity 124. The cover 126 is on an arm 132 having an end part 134 forming a bushing journalled on the shaft 136, supported from bracket 138 extending from the end of the frame 120. The cover 130 is on an arm 142 having a similar bushing at its opposite end which is mounted on a shaft or pivot stem similar to the stem 136 similarly supported at the other end of the frame 120. Extending from the bushing 134 is a cam follower arm 146 by means of which the cover 126 is lifted and opened as will be described, and on the arm 142 is a similar cam lever 148 which operates similarly to open the cover 130 as will be described.

The cooking unit 12 is carried into and out of the oven by means of the link drive chain 14, the cooking unit being guided by guide tracks or rails. At the ends of the frame 120 there are downwardly extending lugs one of which at one end is designated at 152 and rotatably mounted thereon is a roller wheel 154 on a shaft 156. There are two of such roller wheels at the end of frame 120. At the opposite end of the frame are similar downwardly extending lugs one of which is designated at 160 carrying a similar roller wheel 162 on a shaft or stem 164. There are two roller wheels like the roller 162 at that end of the frame 120. These roller wheels engage guide tracks such as designated at 166 and 166' in FIG. 3 which extend parallel and adjacent to but spaced from the link chain 14. At one point the link chain is fastened to U-shaped bracket 170 by an attaching pin 172. This bracket is further attached by screws to an angle bracket 174 to which is attached a transverse drive pin 176 which is engaged in an aperture 180 in a lug 182 that extends downwardly from the frame 120 as may be seen in FIGS. 3 and 4.

The cam levers 146 and 148 similarly engage with guide tracks or rails at appropriate positions in the path of travel of the cooking unit 12 so as to lift and open the covers 126 and 130 at the appropriate time for discharging the cookies. At this same time the ejector means operate to eject the cookies from the cavities 122 and 124. Cooperating with the cavity 122 is a circular ejector 180 having a peripheral flange 182 and a downwardly extending operating stem or arm 184 having spaced cam lugs 186 and 188 that cooperate with an operating or cam rail as will be described. Cooperating with the cavity 124 is an ejector 190 having a peripheral flange 192 and a downwardly extending operating stem 194 having cam lugs 196 and 198 that cooperate with a cam rail.

FIG. 3 shows the ejector operating stems 184 and 194 and they cooperate with cam rails 196 and 198 which extend parallel to the rails 166 and 166'. FIG. 4 shows the ejectors 180 and 190 in position in which the batter is cooked and FIG. 3 shows the ejectors in the position which they eject the batter from the cavities 122 and 124 on to the conveyor belts 24 and 24' which conveys the cookies to the fortune strip dispensing unit. Brackets are provided adjacent to the cavities 122 and 124 to limit the inward travel of the ejectors 180 and 190 as designated at 202, 204, 206 and 208.

At the time and position that the cookies are ejected from the cooking unit 12 as described, the cam lever arms 146 and 148 on the covers 126 and 130 engage with cam rails 212 and 214 that are parallel to the rails 196 and 198 which cause the covers 126 and 130 to be swung to an open, out of the way position as may be seen in FIG. 3. The cookies having been discharged onto the conveyor 24–24' are then carried to the fortune slip dispensing unit described in the foregoing.

Fortune slip dispensing unit

As pointed out in the foregoing, the machine is fully automated which includes that the pre-printed fortune slips which are originally printed on a continuous roll of paper or tape, are cut off in the proper lengths and automatically dispensed onto the circular fortune cookies after baking. The unit is shown in detail in FIGS. 5 and 6. It comprises a pair of frames 230 and 232 as shown in FIG. 5 and mounted on them are three pairs of drive rollers 234, 236 and 238, the latter pair including the rollers 238 and 238' as may be seen in FIG. 6. The pairs of rollers are substantially tangent to each other, the pair 234 being on shafts 242 and 244; the pair 236 being on shafts 246 and 248 and the pair 238 and 238' being on shafts 252 and 254. On the shaft 254 is a gear 262 meshing with a larger gear 264 and this gear is on a shaft 268. Also in this shaft is a ratchet wheel 272 having spaced ratchet teeth which is driven by a pawl 276. Numeral 280 designates a link on the shaft 268 and attached to the end of this link by way of a shaft or pin 282 is a drive link or arm formed of spaced links 284 and 286. These links are pivotedly connected by a pin 292 to an eccentric cam member 44 having a circular opening 296 that engages an eccentric cam disc 300 on shaft 302 that is driven from the gear box 42 referred to in connection with FIG. 1.

As previously indicated the fortunes are initially printed on a continuous roll or strip of paper 304 which is fed into the dispensing unit 40 between the three pairs of rollers, the shafts of which are all geared together by pairs of gears as designated at 306, 308, 310 and 310'. Numerals 320 and 322 designate knife blades which come adjacent to each other and shear off a section of paper tape having a fortune printed on it when the rollers 238 and 238' are rotated. All of the rotors, that is, the pairs of rotors are rotated in steps of appropriate length by operation of the drive mechanism driven by the eccentric cam 300 which as may be observed reciprocates the pawl 276 which engages with the ratchet 272 to operate the unit in steps. The unit is, of course, operated at appropriate speed so as to be synchronized and to dispense fortune slips onto the cookies at an appropriate rate as they go by on the conveyors 24 and 24'.

The folding mechanism

The folding mechanism component 50 which has been referred to in connection with FIG. 1 is shown in detail in FIGS. 7 and 8 and its manner of operation is illustrated in FIGS. 9 and 10. As may be seen in FIG. 7 the cookies are carried on the conveyor 24, being pushed by the uprights 34 and are delivered onto the platform 330 of the folding mechanism which is supported from the frame structure of the machine substantially at the level of the horizontal reach of conveyor 24. The operating parts of the folding mechanism are associated with the platform 330. In this platform there is a generally rectangular opening 332 having arcuate side parts 334 as shown and end slots 336 and 338. The folding mechanism is dual to fold two cookies at a time, the parts of dual assemblies being similar, and, therefore, only one of them will be described in detail. Above the opening 332 is a folding tongs assembly 342 and it comprises a pair of tongs including the members 344 and 346 having the particular shape shown that is, each of the members of the tongs comprises a leg as shown. They have enlarged upper parts 356 and 358 which are pivotally supported from the cross head 72 on pivot stems 362 and 364 with washer members on opposite sides of the upper parts of the legs of the tongs. Above the pivot stems 362 and 364 the legs 344 and 346 have extending parts 368 and 370 between which is a compression biasing spring 372 which tends to push the extensions 368 and 370 apart in a manner tending to close the tongs. As may be seen the dual tongs assemblies are moved up and down by the cross head 72.

As previously described, the rocker link 64 is driven by way of the cam 56, the rocker link 64 being supported from the support members 68 and 68' which extend upwardly at an angle from the frame which supports the platform 30. The yoke 72 has a pair of yoke or lug members 376 and 378 between which the end of the rocker arm 64 is pivoted on pivot pin 380. At the ends of the cross head 72 are integral bushings 382 and 384 which can slide vertically on the cylindrical stems 74 and 74' which are supported from the frame structure of the machine. In operation the tongs assemblies for example, the tongs 342 is moved downwardly through the opening 332 in the platform 330. In this folding operation the cookie is folded through the slot 332 over a bar 390 which is below the slot 332 and at right angles to it and this bar is retractable. This is shown more particularly in FIG. 8.

The cross head 72 is movable downwardly being driven by the cam 56 against springs 75 and 75' which are on the stems 74 and 74'.

The end of retractable bar 390 is connected to a link 394 by a pivot pin 396. The upper end of link 394 is positioned between two support arms 400 and 402 which extend upwardly at an angle from the frame of the machine, the upper end of link 394 being connected by way of a pivot stem 404. The end of link 394 has an extending cam projection or nose 406 which is engageable with the cross head 72 during its downward stroke as will be described. As previously pointed out the other one of the tongs assemblies is similar in construction and is, therefore, not described in detail herein.

The support arms 400 and 402 are positioned between further horizontal support arms 410 and 412 at the end of which and positioned over the slot 332 is a vertical plate 414. At the ends of this plate are two rollers 416 and 418 supported on horizontal pivot shafts in a position to be engageable by slanting cam surfaces 422 and 424 on the inside of the upper part of the links 344 and 346 of the tongs. In operation the cross head is driven up and down by the cam 56. The legs 344 and 346 of the tongs move down through the slot 332 at a time when a cookie blank has been placed on the platform 330 overlying the slot. This folds the cookie about a diameter lying along the medial axis of the slot 332. See FIG. 8. The cookie thus folded is then pushed down onto the bar 390 and it is folded about this bar about an opposite diameter, the fortune slip blank being within the cookie, having been positioned on the cookie as shown at the time of the first folding. After the cookie has been folded about the bar 390 the cross head 62 engages the cam extension 406 causing the link 394 to rotate in a clockwise direction retracting the bar 390 and releasing the folded cookie to be grasped by the take-away mechanism and removed. The action is illustrated in FIGS. 9 and 10. The cookie is folded about one diameter as it is pushed through the slot 332 folding it about the fortunte slip and about an opposite diameter as it is folded over the bar 390. Having been thus folded the legs 344 and 346 of the tongs, that is, the slating cam surfaces 422 and 424 of the legs engage the fixed rollers 416 and 418 tending to spread the tongs against the force of spring 372 so that the cookie is released by the tongs so that it can be taken away by the take-away mechanism. At this time the cross head 72 engages the cam extension 406 on the link 394 and retracts the bar 390 as is illustrated in FIG. 9. At this time the take-away mechanism operates to grasp the cookie and take it away as will be next described.

The take-away mechanism

The take-away mechanism is described at 80 as has been referred to in connection with FIG. 1, and is shown in more detail in FIG. 7, the operation being illustrated in FIGS. 9, 10 and 11. The take-away mechanism is a dual mechanism like the folding mechanism so that only one of the assemblies of the take-away mechanism need be described, the other being a duplicate. Numeral 96 designates a cross head that moves up and down having bushing 430 and 430' at its ends that can move vertically on guide rods 432 and 432' against the force of the coil springs 434 and 434'. At the midpoint of cross head 96 is a slot 438 and the rocker link 86 is pivotally attached to the cross head for operating it on a pivot stem 98. On the top of the cross head 96 are outstanding lugs 442, 444, 446 and 448 and journalled in these lugs is a transverse shaft 454. This shaft is biased in a clockwise direction by torsion spring 458 which is attached at one end to the shaft and at the other end to the lug 444. The shaft 454 carries the pair of flexible bifurcated take away fingers 102 and 102' which are bent or curved outwardly at the ends as shown. On the shaft 454 are extending projections 460 and 460' which engage upright members 461 and 461' which allow the take away fingers to rotate to a vertical position as cross head 96 begins to move upwardly. As previously pointed out, all components of the machine are operated in synchronism and in order to effectuate the purposes of the operation. In operation the cam 82 drives the rocker arm or link 86, the cam being contoured so that in operation the cam 82 drives the rocker link 86 to move the cross head 96 upwardly against the springs 434 and 434'. The extending cam projections 460 and 460' engage the fixed abutments 461 and 461' allowing the shaft 454 to rotate as the cross head moves upwardly rotating the grasping fingers 102 and 102' into a vertical position for clasping the folded cookie and taking it away. The cam 82 is contoured so that after the initial rotary movement of shaft 454 the cross head moves upwardly more rapidly without further rotation of the fingers 102 and 102' as is illustrated in FIGS. 9 and 11. FIG. 11 shows the rotational movement of the spring grasping fingers after which they move upwardly as may be seen in FIG. 9 into a position in which they grasp the folded cookie as may be seen in FIG. 10. The cam 82 then permits the cross-head 96 to move in reverse direction. The movements of the spring grasping fingers are now in reverse. They move downwardly and then rotate again in the opposite direction when cam projections engage members 461 and 461', into a position in which they overlie the conveyor 466 which has upstanding fingers on it as shown at 468. The individual folded cookie is brought down over projecting stem or finger 468 on the conveyor 466 so that the cookie is conveyed and carried away without its shape being impaired or disturbed.

The drive mechanism of the machine

Two motors and gear boxes are provided in the machine for driving the components. All components are, of course, suitably supported on frame members of the machine as are the motors and gear boxes a preferred arrangement of motors, gear boxes, sprocket wheels and drive chains being shown in FIG. 2. A motor 470 drives a gear box 472 through a pulley 474. The gear box has an output shaft 476 on which is a sprocket 478 which drives chain 480 that drives gear 482 that is on the shaft as previously described sprocket wheel 18 which drives the conveyor chains that moves the cooking unit through the oven.

On the same shaft as the sprocket wheel 18 is a small sprocket wheel 492 that drives chain 494 which engages with the two idler sprockets 496 and 498 and also meshes with a larger sprocket wheel 502 on the shaft of sprocket wheel 502 is sprocket 504 which serves to drive the conveyor belt 24 and also drives sprocket chain 506 that passes over a sprocket wheel 510. There is another sprocket wheel on the shaft of sprocket 510 which drives the sprocket chain 512 that passes over or engages with idler sprockets 514 and 516 and it also passes over sprocket wheel 520 that is on a shaft that drives the take-away conveyor 466.

Numeral 530 designates another drive motor that drives a pulley 532 of gear box 534. Gear box 523 has an output shaft 536 on which are sprocket wheels including a sprocket wheel 538 that drives chain 548 which drives the sprocket wheel 550 on shaft 552 that serves to drive the dispensing component 40, that is, it drives the component 40 by way of the gear box 42 and the mechanism previously described.

The additional sprocket wheel on shaft 536 drives a chain 558 which drives a sprocket wheel 560 on shaft 562 which drives the cam 82. On the shaft is another sprocket wheel that dirves the chain 564 which in turn drives a sprocket wheel 566 on shaft 568 which carries the cam 56 for driving it.

Summary of operation of the complete machine

Those skilled in the art will understand the operation of the machine since the operation of individual components thereof has been described. The following, however, will sumarize the complete operation of the machine, the organization of which is illustrated in FIG. 1.

The cooking unit or units continuously travel through the oven for baking the batter. The batter is dispensed into the cavities of the cooking unit 12 as described from the hopper which overlies these units as they pass into the oven 10.

As the cooking unit comes out of the oven it is in an inverted position as may be seen in FIG. 1 and in FIG. 3. The cooking then engages the cam rails or guide rails as previously described which cause the ejectors 180 and 190 to eject the cookies from the cooking unit, the covers 126 and 130 being opened as illustrated in FIG. 3 as previously described. The cookies are stripped off the top (inverted) surface of the cooking unit and delivered onto the conveyor 24 where they are moved or pushed by the upstanding projections 34 and delivered onto platform 330 of the folding mechanism after passing the fortune slip dispensing component 40. As described this dispensing component places a fortune slip on each cookie as illustrated in FIG. 5.

The fortune cookie is disposed over a slot such as the slot 338 in platform 30. The cross head 72 is then operated as described so that the tongs 342 moves downwardly and through the slot 338 folding the fortune cookie about a diameter as described, the movement of the tongs downwardly causing its legs to straddle the horizontal bar 39 and thus folding the fortune cookie about a second diameter which is normal to the first diameter with the fortune slip folded inside as may be seen in FIG. 10 and other figures. Toward the end of the downward stroke of the tongs 342 the cam surfaces 422 and 424 on the inside of the legs of the tongs engage the rollers 416 and 418 causing the tongs to separate and to release or let go of the fortune cookie at which time it is grasped by the take-away fingers such as shown at 102 and 102' so that the fortune cookie, even though still plastic, can be removed without deformation of it. At the end of the stroke of the cross head 72 it engages the cam projection such as that shown at 46 which operates the link 94 to retract the folding bar 390 to facilitate the grasping and taking away of the completed cookie.

At the completion of the folding, the cam 82 operates the cross head 96 to move it upwardly as previously described first causing the shaft 454 to rotate the spring fingers 102 and 102' upwardly into a vertical position as illustrated in FIG. 11 after which these spring fingers bodily move upwardly under the influence of the operating cam 82 driving the cross head 96 so that they move up and grasp the completely folded fortune cookie, the folding bar 390 now being retracted. All movements are, of course, timed and in appropriate synchronism as previously set forth. Upon continued rotation of cam 82 cross head 96 moves in a reverse direction, that is downwardly, and the spring fingers 102 and 102' rotate in a reverse direction placing the fortune cookie onto the conveyor 470 and upon one of the projections 472 to be taken away by the conveyor.

From the foregoing, those skilled in the art will understand the nature of the invention in that it is a completely automated fortune cookie machine. Also those skilled in the art will understand the manner in which the objects set forth in the foregoing are achieved and realized as well as the many advantages including those specifically referred to as well as those that are apparent from the detailed description.

The foregoing disclosure is representative of a preferred form of the invention and is to be interpreted in an illustrative rather than a limiting sense, the invention to be accorded the full scope of the claims appended hereto.

What is claimed is:

1. A fortune cookie machine comprising in combination: an oven; conveyor means movable through the oven; a cooking unit for batter to be cooked which is carried through the oven by the conveyor means; means to form and cook individual cookies in the cooking unit, said cooking unit including means for ejecting cookies from the cooking unit to be transferred therefrom on a conveyor belt to the folding mechanism; and means to fold the cookies about two axes that are normal to each other to enclose a strip of paper.

2. A machine as in claim 1 including dispensing means for strips of paper having printing thereon to be enfolded into the fortune cookies.

3. A machine as in claim 1 wherein said cooking unit embodies a structure having cylindrical cavities for containing batter to be cooked, and means for transferring cookies from the cooking unit to a conveyor.

4. A machine as in claim 1 wherein said folding means comprises a platform having a slot therein, a bar underneath the slot transverse thereto, means comprising a yoke movable downwardly through the slot to thereby push a fortune cookie therethrough so as to fold it about a diameter and to further fold the said fortune cookie about said horizontal bar, and means for taking away the formed fortune cookie.

5. A machine as in claim 1, said unit having at least one cavity to receive batter to be cooked.

6. A machine as in claim 5 including means for inverting the position of the cooking unit upon emergence from the oven.

7. A machine as in claim 5 wherein said ejecting means comprises a plunger movable in the said cavity to eject cooked batter therefrom.

8. A fortune cookie machine comprising in combination: an oven; conveyor means movable through the oven; a cooking unit for batter to be cooked which is carried through the oven by the conveyor means; means to remove cookies from the cooking unit; and means to fold the cookies about two axes that are normal to each other to enclose a strip of paper, said folding means comprising a platform having a slot therein, a bar underneath the slot transverse thereto, means comprising a yoke movable downwardly through the slot to thereby push a fortune cookie therethrough so as to fold it about a diameter and to further fold the said fortune cookie about said horizontal bar, and means for taking away the formed fortune cookie, said yoke having a pair of legs and means for separating the legs to release the fortune cookie after forming it.

9. A machine as in claim 8 wherein said removal means comprises mechanism for grasping the fortune cookie and withdrawing it.

10. A machine as in claim 8 including means to retract said bar after folding of the cookie to facilitate removal of the cookie.

References Cited

UNITED STATES PATENTS 3,265,016  8/1966  Cheung _____ 107—1(1)

EDWARD L. ROBERTS, Primary Examiner

U.S. Cl. X.R.

107—1, 57A